April 7, 1931. F. S. FLOETER 1,799,291
TOOL CARRYING DEVICE FOR DOUBLE ACTING TURNING LATHES
Filed Nov. 8, 1926
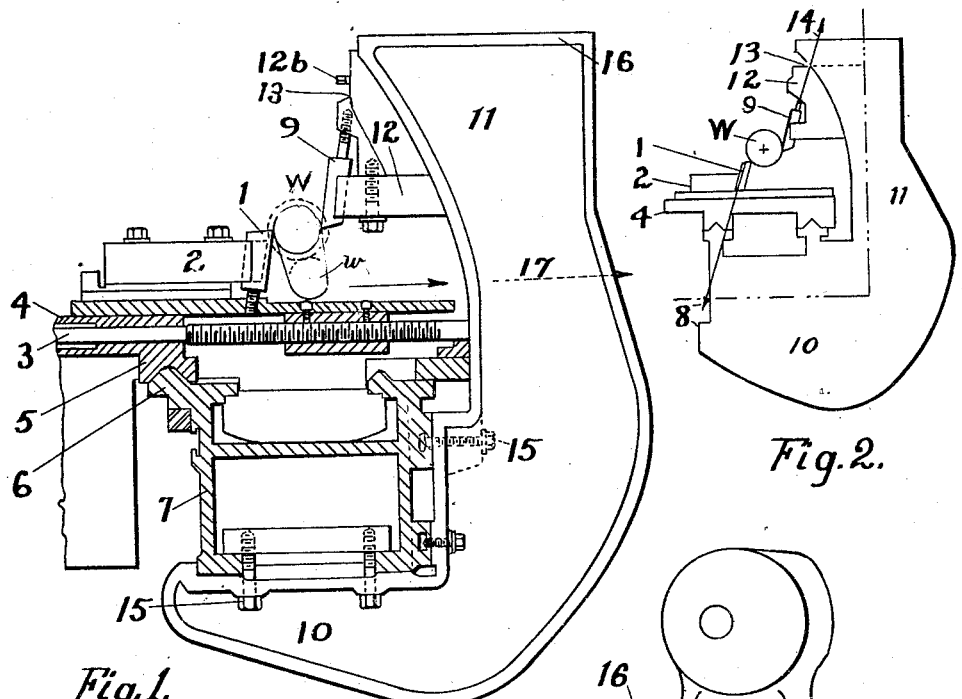
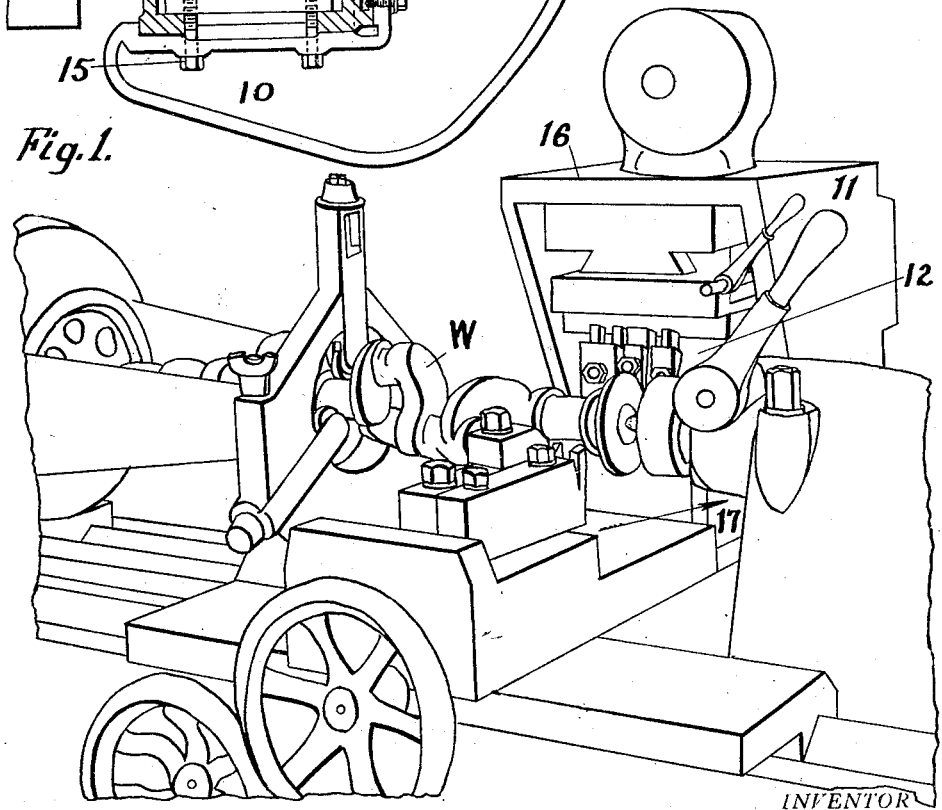
INVENTOR
Frederick S. Floeter
BY George B. Willcox
ATTORNEY Patented Apr. 7, 1931

1,799,291

UNITED STATES PATENT OFFICE

FREDERICK S. FLOETER, OF SAGINAW, MICHIGAN, ASSIGNOR TO WICKES BROS., OF SAGINAW, MICHIGAN, A CORPORATION OF MICHIGAN

TOOL-CARRYING DEVICE FOR DOUBLE-ACTING TURNING LATHES

Application filed November 8, 1926. Serial No. 147,036.

This invention relates to turning lathes and pertains more particularly to that class of turning lathes adapted to shape an article, such as a crank shaft pin and the cheeks of the cranks by simultaneously applying two cutting tools, one to one side and the other to the other side of the revolving work, there being a cutting tool located in front of the work, that is, on the operator's side of the machine, and another tool located on the opposite side of the work, the two tools being thrown into work simultaneously. For the purposes of this description I will refer to such a lathe as a "double acting" lathe.

The object of my present invention is to enable the lathe to work at unusually high rates of cutting speed, taking cuts of unusual depth, but producing work with a high degree of accuracy and finish. I attain these objects by means of a novel mounting for the rear tool, whereby all tendency toward chattering is eliminated, even when taking very heavy cuts. Chattering is avoided by mounting in an inverted position the slide that carries the rear tool and seating it against the bottom face of a frame of novel and extremely rigid construction.

The frame has the physical characteristics of a punch-press body, in that the lower jaw of a punch press carries one of the die members and the upper jaw carries the other die member, the function of the back frame being to resist the tendency of the two jaws to spring apart when the die is under load.

In my invention I apply this same punch-press principle to a double acting turning lathe by mounting the front and back cutting tools on supporting slides, the front slide positioned normally, that is to say, located and operated as in an ordinary lathe on a cross-slide carried by the girder-frame bed, the rear slide inverted and mounted against a horizontal bearing face on the under side of the rigid upright member of the frame, as will be described and claimed herein.

In this manner the frame members have their bearing faces respectively adapted to resist the downward and the upward working pressure of the slides and the frame as a whole rigidly withstands the tendency to spread and acts in the manner of a punch-press body.

Another feature of my invention is in the construction of the upright frame member, which is so formed that the revolving work serves as an impeller to drive the chips clear of the machine by sending them through an opening in the upper member of the frame. The cutting zone of the machine is thus automatically kept free from chips.

With the foregoing and certain other objects in view, which will appear later in the specification, my invention comprises the devices described and claimed and the equivalents thereof.

In the drawings Fig. 1 is a cross sectional view through the bed of a lathe to which a preferred form of my invention is applied.

Fig. 2 is a diagrammatic view illustrating the mode of operation of the tool-carrying frame for mounting the back cutting tools rigidly to prevent chattering.

Fig. 3 is a front view in perspective, showing the parts illustrated in Fig. 1.

As is clearly shown in Figs. 1, 2 and 3, W designates the work, which may be a crank shaft for an engine or any other suitable article to be turned, and 1 is the cutting tool usually carried by the front cross slide 2 which is adjusted by the cross feed screw 3. The cross slide is mounted on the horizontal bearing face 4 of main slide 5 carried by ways 6 on the lathe bed 7, as usual in turning lathe construction.

It need only be pointed out here that the downward thrust of the front cutting tool 1, as indicated by the arrow at 8 in Fig. 2, produces downward pressure of the cross slide 2 upon the horizontal bearing face 4. Obviously there is no tendency to chatter, because the slide 2 is always in close contact with the bearing face 4, whether the tool is under load or not. A cutting load merely tightens the contact between the faces of 2 and 4.

My invention comprises a novel construction for a rigid nonchattering mounting for the back cutting tool 9. This novel construction comprises a rigid frame consisting of a horizontal member 10 and an upright member 11, on which latter the tool is mounted in the following manner:

Tool 9 is fixed to a tool-carrying slide 12, similar to slide 2 but inverted. The upper flat horizontal face of this slide extends across the space between the side walls of the upright member 11 which are spaced, as shown, for that purpose. The flat horizontal face of slide 12 takes against a bearing face 13 on the under side of upright member 11, so the upward thrust of cutting tool 9, indicated by the arrow 14 in Fig. 2, produces upward pressure of slide 12 against the wide, flat, horizontal bearing face 13. Slide 12 is adjusted by a cross-feed screw 12b in the usual manner.

It is now plain that the bearing face 4 which carries the front cutting tool, and the inverted wide, flat, horizontal bearing face 13 which takes the upward thrust of the back cutting tool 9 are in effect the working or thrust-resisting faces of a rigid jaw-like frame. In the form illustrated in Fig. 1 this frame is made of upright member 11 and horizontal member 10 and the lathe bed 7 and main slide 5 constitute in this case merely an addition to the horizontal frame member 10 in so far as the purposes of this invention are concerned.

From a structural standpoint Fig. 1 shows the ordinary lathe bed 7, to which the upright tool-carrying member 11 is rigidly fixed. Bolts 15 are shown as the connecting means, but the lathe bed and the frame-members 10 and 11 may be secured in any other way, or cast integral, the only requirement being that the frame shall not spring under cutting load to permit the tools to chatter. The heavier the load the tighter will slides 2 and 12 seat themselves against bearing faces 4 and 13 of the respective frame-members 10 and 11. The cross slide 12, being inverted, seats itself on the immovable horizontal bearing face 13 that spans the width of frame member 11 from side to side, the same as cross slide 2 seats itself firmly on face 4 in an ordinary lathe.

By the means above described I have produced in a tool holder for double cutting lathes a frame that acts to prevent chattering as effectively as the rigid body of a punch-press. A claimed feature of the invention resides in the horizontal frame-member and the upright member rigidly connected, or integral as may be desired, the horizontal member having its usual horizontal bearing 4 that supports a normally positioned tool-carrying slide 2, the bearing face adapted to resist downward pressure caused by the thrust of the tool, in combination with the upright member of the frame provided with a horizontal bearing face 13 on its under side and spanning the space between the separated side walls of the upright frame, the face 13 of the slide 12, upon which the back tool is mounted.

The claimed automatic discharging feature of the machine will now be described. The work W, which may be an engine crank shaft or similar article, revolves in the direction of the arrow, Fig. 1, and the crank pins w act as impellers tending to drive the loose chips away from the operator, or to the back side of the lathe. The upright frame-member 11 is in the form of a hollow box, the wide, horizontal, flat-faced tool-carrying slides 12 extending across it from side to side and supported by its top 16.

A passageway 17 through the box-like frame between its separated side walls permits the chips impelled by the pin w to pass freely through, clear of the working areas of the machine.

By this means I not only attain the advantages of rigidity and strength above described, but I also produce a heavy duty lathe that is self-cleaning, in that it can not become clogged with loose chips.

In Fig. 3 I have shown one tool-carrying frame made in accordance with my invention. More than one may be employed, however, as required.

Having thus described my invention, what I claim and desire to secure by Letters Patent is:

1. In a double acting lathe, a lathe bed, a frame rigid to said bed and projecting upwardly at one side thereof, the upper part of said frame formed with a wide flat horizontal bearing face between the side walls of the frame, a top connecting member joining the sides of said frame, an inverted tool-carrying slide operatively mounted upon said face and adapted to feed the cutting edge of the tool radially toward the central axis of the lathe, the said horizontal face adapted to resist upward pressure of said slide, for the purposes set forth.

2. In a double acting lathe, a lathe bed, a box-like frame rigid to said bed and projecting upwardly at one side thereof, the upper part of said frame formed with a bearing face and having a top connecting member between the side walls thereof, an inverted tool-carrying slide operatively mounted upon said face and adapted to feed the cutting edge of a tool radially toward the central axis of the lathe, the said face adapted to resist upward pressure of said slide, for the purposes set forth.

3. In a double acting lathe having slides carrying back tools and front tools respectively, a box-like frame with spaced side walls, said side walls joined by a top member, each end of said frame formed with a flat horizontal face having a tool-carrying slide thereon in alinement with the opening between said side walls, said faces adapted to thrust of its cutting tool, for the purposes set forth.

4. In a double-acting lathe having slides carrying back tools and front tools respectively, a frame with its sides spaced apart, the lower end of said frame rigidly secured to the bottom and to the rear side of the bed of said lathe and having a tool-carrying slide thereon, the upper end of said frame comprising two side members and a connecting top member formed with a horizontal bearing face, an inverted tool-carrying slide mounted on said face, the upwardly extending part of said frame intermediate its ends acting as a strong-back to withstand the thrusts of both tool-carrying slides, for the purposes set forth.

In testimony whereof, I affix my signature.

FREDERICK S. FLOETER.